Patented Jan. 14, 1941

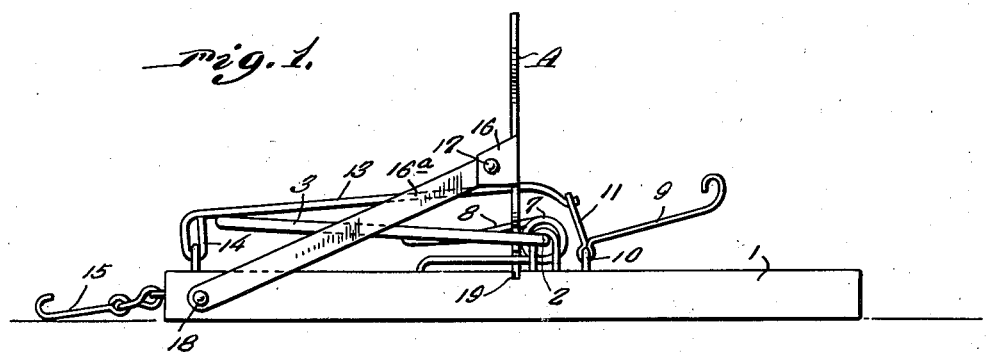
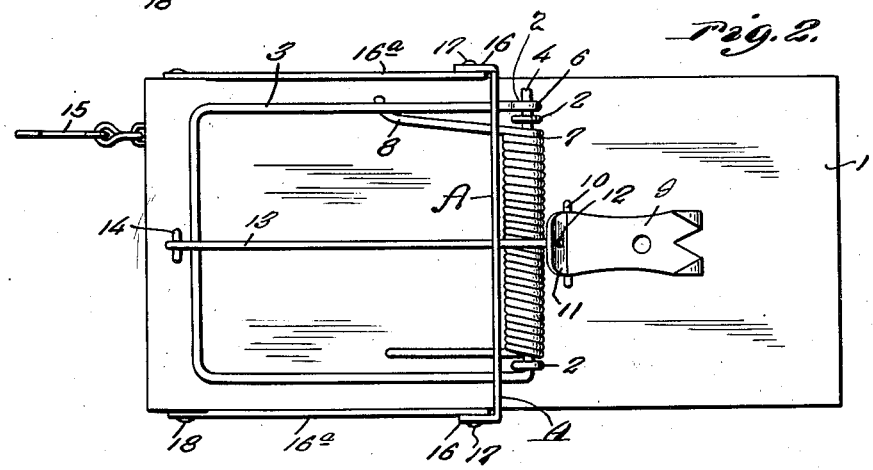
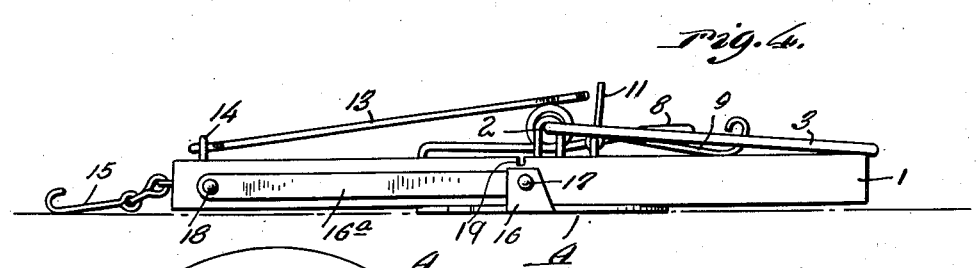
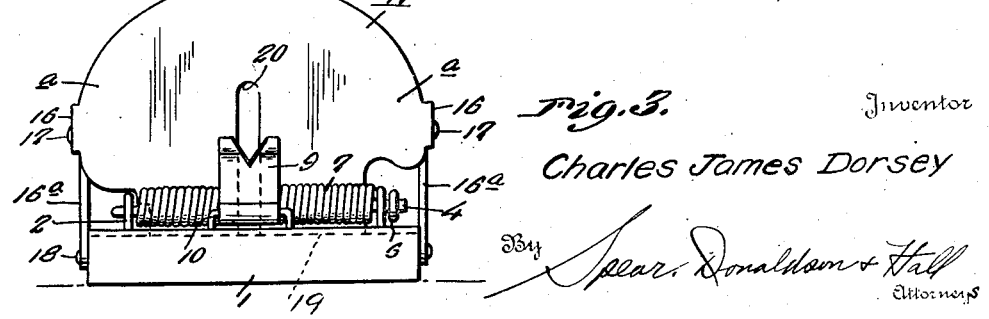

2,228,695

UNITED STATES PATENT OFFICE 2,228,695

ANIMAL TRAP

Charles James Dorsey, Baltimore, Md.

Application July 1, 1939, Serial No. 282,492

10 Claims. (Cl. 43—81)

This invention relates to animal traps of the type in which a spring impelled striker is released when a bait plate is operated by the animal attempting to get at the bait, the said striker, when operated, delivering a blow to the animal with such force as to disable or kill it, the said trap having a barrier which will prevent the animal from reaching the bait excepting from the prescribed point which will insure the striker contacting with the animal when released.

In my improvement, the barrier is operated by a latch or trigger member when this is released, the movement of the barrier taking place in the direction opposite to the direction of movement of the striker member.

The improvement also relates to the mounting of the barrier preferably by links pivoted thereto and to the base of the trap, the said mounting allowing the barrier to be folded on the underside of the base plate when the trap is not in use, or when it is being transported.

In the accompanying drawing

Figure 1 is a side elevation of the trap embodying my invention.

Fig. 2 is a plan view.

Fig. 3 is a view looking from one end of the trap, illustrating the shape of the barrier and the relation of said barrier to the other parts of the trap when the same is set ready for action.

Fig. 4 is a side view of the trap with the barrier and its connections in folded position relative to the base and other parts of the trap.

In the drawing, 1 indicates the base of the trap which may be either of wood or metal. Pivotally mounted at 2 is the striker 3 which, as in ordinary practice, is in the form of a wire loop having its cross portion 4 extending through an eye 6 at one terminal of the striker loop.

A spiral spring 7 surrounding the cross portion 4 of the striker imposes its tension on said striker by an arm 8 of said spring overlying one side of the striker loop. The other end of said spring is fastened in any suitable way to the base as by having its end driven into the base, if made of wood or like material, or this end of the spring may be held in any other suitable way.

The bait plate consists of a member 9 pivotally mounted at 10, and having an upstanding portion 11 which has an opening 12 adapted to receive the bent end of a latch 13 pivotally mounted at 14 to the base, all of these parts being of substantially ordinary construction.

A safety catch is provided at 15 to hold the striker member or loop in position while the latch is being set into engagement with the bait holding member or plate 9, by making the end of the latch engage the opening 12 in the upstanding portion of said bait plate.

The fence or barrier shown at A consists of a piece of sheet metal having ears 16 upset therefrom at its opposite edges, to which ears links 16a, one at each side of the trap, are pivoted as at 17. The other ends of these links are pivoted to the side faces of the base of the trap at 18. This barrier at its lower edge fits into a groove or notch 19 formed in the upper surface of the bed or base at a point in the rear of the bait plate, and preferably in the rear of the spring mounting of the striker.

As thus located, the barrier plate A will prevent the rat or mouse from approaching the bait plate from the rear, but, on the contrary, the rat, in order to reach the bait, will have to approach the same from the front or right-hand end of the trap, as illustrated in Fig. 1, and thereby be within the range of the striker loop or member 3 when this is released and is forcibly impelled clockwise to strike the rat located adjacent the bait plate at the right of Fig. 1.

The barrier is provided with a slot 20 arranged about centrally thereof through which the retaining latch 13 passes from its pivot 14 to its point of connection at 12 with the bait plate.

With the arrangement thus far described, when the bait plate is operated to release the latch 13, the striker loop or wire member 3, acting upon the latch on the underside thereof near its pivot 14, will forcibly throw said latch upwardly in an anti-clockwise direction, Fig. 1, and cause said latch by striking the wall at the upper end of the slot 20, to forcibly throw the fence or barrier in an anti-clockwise direction, Fig. 1, and out of the way of the striker member 3 in its movement towards the rat in a clockwise direction, Fig. 1.

It will be noted that the barrier has laterally extending portions $a$ reaching substantially to the vertical planes in which the side faces of the base of the trap lie, so as to provide a wide barrier to effectually prevent the rat from approaching the bait plate from the rear, and so that when the trap is set, these laterally extending portions of the barrier extend over the sides of the wire loop forming the striker. The movement of the barrier away from its operative position is, therefore, necessary in order that it will not interfere with the operation of the loop forming the striker.

The movement of the barrier takes place rapidly, because as soon as the lefthand end of the striker shown in Fig. 1 makes a slight movement upwardly, and because the contact of the striker with the latch 13 takes place close to the pivot 14 of said latch, the movement of the portion of the latch which contacts with the barrier is greatly multiplied, so that during the first part of the upward movement of the striker from the position shown in Fig. 1, towards the right of said figure, the complete removal of the barrier out of the way of the striker will have been accomplished, so that there will be no clashing of the striker against any part of the barrier or its link supports.

As shown in Fig. 4, the barrier may be folded against the underside of the base of the trap. Being formed of sheet metal, and occupying a position against the underface of the base, it will take up little space, and this will enable the article to be shipped conveniently, or packed away in storage or in the store, and when the barrier is folded as just mentioned, the article may be handled conveniently.

I do not limit myself to the particular means for connecting the barrier to the base, or to other detailed features of the invention the scope of which is defined by the appended claims.

It will be understood that for the purposes of this description the term "front" as applied to the trap means that portion of the trap or that location which is at the right of Fig. 1, and that the term "rear" means that portion or that location which is at the left of Fig. 1.

The barrier A, when set to prevent the animal from gaining access to the bait from the rear, lies intermediate the front and rear portions of the trap.

I claim:

1. In combination in an animal trap, a base, a pivotally mounted spring pressed striker loop, a latch for holding the striker in horizontal position ready for operation, at the rear of its pivot, said striker when released having movement through substantially 180° from its said horizontal position in rear of its pivot to its substantially horizontal position in front of said pivot, a bait plate for holding the latch ready for operation, a barrier for preventing the animal from reaching the bait from the rear of the trap, said barrier when set occupying a position intermediate the front and rear limits of movements of the striker, and link means connecting the said barrier movably with the base of the trap and bodily carrying the barrier, said barrier being operated rearwardly away from its set position by the said latch under pressure from the spring pressed striker, substantially as described.

2. In combination in an animal trap, a base, a spring pressed striker pivotally mounted on the base to swing from rear to front thereof through an angle of substantially 180°, when operated by the spring, a latch pivoted to the rear portion of the base, a bait plate mounted on the front portion of the base, engaging the front end of the latch and adapted to release the same when the bait plate is operated, a barrier, means carrying the barrier independently of the latch and pivoted to the base plate, said latch contacting and throwing the barrier rearwardly out of the path of the striker as the said striker swings forwardly through said 180° angle to strike the animal which tripped the bait plate, substantially as described.

3. An animal trap according to claim 2 in which parallel links pivoted to the side faces of the base plate are pivoted to the barrier, substantially as described.

4. An animal trap according to claim 2 in which the means carrying the barrier consist of parallel links pivoted to the side faces of the base plate and to the barrier, a recess in the upper face of said base plate receiving a portion of the barrier to maintain it substantially in upright position relative to the base.

5. An animal trap according to claim 2 in which the barrier is slotted and the latch extends therethrough with lost motion before contacting the upper wall of said barrier.

6. A trap according to claim 2 in which the barrier has lateral extensions overlying the sides of the striker and reaching to the sides of the base, substantially as described.

7. A trap of the character described having a bait plate and a striker, a barrier to prevent the animal approaching the bait from the rear, means connecting the barrier movably with the base of the trap and controlling the movement thereof, said barrier being foldable relative to the base to lie against the under side thereof when not in use, substantially as described.

8. A trap according to claim 7 in which the connecting means consists of ears on the barrier and links pivoted to the ears and to the side faces of the base of the trap, substantially as described.

9. In combination in an animal trap, a base, a bait plate at the front of the base, a striker pivotally mounted intermediate of the front and rear portions of the base and swinging from rear to front under spring tension through an angle of approximately 180° from one substantially horizontal position to another, means for holding and releasing the striker, and a barrier to prevent the animal from approaching the bait plate from the rear of the trap, said barrier when set in working position extending across the pathway of the striker, means for flexibly connecting said barrier with the base, said barrier being impelled in a direction from front to rear of the base across and away from the path of the striker and by the power of said striker in its movement to the front of the trap, substantially as described.

10. In combination a base, a recess therein for receiving the lower portion of a barrier, a striker pivotally mounted on the base, a bait plate, a latch held by said bait plate, a barrier having its lower portion fitting in the recess in the base plate, linkage pivoted to the base plate and to the barrier, a spring for operating the striker, said striker being arranged to operate the latch and said latch being arranged to operate the barrier, said barrier when operated by the said latch moving in a direction opposite to that of said striker, substantially as described.

CHARLES JAMES DORSEY.